US008661911B2

United States Patent
Oizumi (10) Patent No.: US 8,661,911 B2
(45) Date of Patent: Mar. 4, 2014

(54) PIEZO-RESISTIVE PRESSURE SENSOR (75) Inventor: Norikazu Oizumi, Tokyo (JP)

(73) Assignee: Mitsumi Electric, Co., Ltd., Tokyo (JP)

(*) Notice: Subject to any disclaimer, the term of this patent is extended or adjusted under 35 U.S.C. 154(b) by 172 days.

(21) Appl. No.: 13/162,111

(22) Filed: Jun. 16, 2011

(65) Prior Publication Data

US 2011/0308323 A1 Dec. 22, 2011

(30) Foreign Application Priority Data

Jun. 16, 2010 (JP) .................... 2010-137290

(51) Int. Cl.
*G01L 9/06* (2006.01)

(52) U.S. Cl.
USPC .............................. 73/721; 73/727

(58) Field of Classification Search
USPC .................................. 73/700–756
See application file for complete search history.

(56) References Cited

U.S. PATENT DOCUMENTS

| 5,471,086 | A | * | 11/1995 | Ipposhi et al. | 257/417 |
| 5,761,957 | A | * | 6/1998 | Oba et al. | 73/727 |
| 7,497,126 | B2 | * | 3/2009 | Tojo et al. | 73/715 |
| 2005/0274191 | A1 | * | 12/2005 | Hasegawa et al. | 73/721 |
| 2006/0137456 | A1 | * | 6/2006 | Dasgupta et al. | 73/705 |
| 2008/0178681 | A1 | * | 7/2008 | Asada et al. | 73/754 |
| 2008/0202248 | A1 | * | 8/2008 | Tojo et al. | 73/721 |
| 2012/0017690 | A1 | * | 1/2012 | Philipps | 73/724 |

FOREIGN PATENT DOCUMENTS

| JP | 2000-162056 | A | 6/2000 |
| JP | 2001-272293 | A | 10/2001 |
| JP | 2002-039888 | A | 2/2002 |
| JP | 2002-039891 | A | 2/2002 |
| JP | 2002-286567 | A | 10/2002 |
| WO | 2009/096407 | A1 | 8/2009 |

* cited by examiner

*Primary Examiner* — Andre Allen
(74) *Attorney, Agent, or Firm* — Washida & Associates

(57) ABSTRACT

Provided is a piezo-resistive pressure sensor that realizes sensitive and accurate measurement of pressure, by reducing the variation of electrical conduction due to thermal variation in piezo resistance elements, without lowering the sensitivity of measurement. Piezo-resistance sections R1, R2, R3 and R4 are arranged on diaphragm 31, near the border between diaphragm 31 and support section 32. By this means, pressure can be measured with high sensitivity. The area of a part where a group of piezo-resistance elements are placed, and the outer shape of that part, are the same between piezoresistance sections R1, R2, R3 and R4. By this means, piezoresistance sections R1, R2, R3 and R4 have uniform temperature distribution and reduce the variation of electrical conduction due to thermal variation in piezo resistance elements.

4 Claims, 8 Drawing Sheets (PRIOR ART)

PIEZO-RESISTIVE PRESSURE SENSOR

CROSS REFERENCE TO RELATED APPLICATIONS

This application is entitled to and claims the benefit of Japanese Patent Application No. 2010-137290, filed on Jun. 16, 2010, the disclosure of which, including the specification, drawings and abstract, is incorporated herein by reference in its entirety.

TECHNICAL FIELD

The present invention relates to a piezo-resistive pressure sensor that detects pressure using piezo-resistance elements arranged on a diaphragm.

BACKGROUND ART

A piezo-resistive pressure sensor has a plurality of piezo-resistance elements arranged on a diaphragm, and these multiple piezo-resistance elements constitute a bridge circuit. By this means, a piezo-resistive pressure sensor is designed to detect pressure by detecting the bend that is produced in a diaphragm by pressure that is applied to the diaphragm, as variation of the resistance of piezo-resistance elements (that is to say, as variation of the output voltage of a bridge circuit). For example, patent literatures 1-3 disclose piezo-resistive pressure sensors of this kind.

Next, a general piezo-resistive pressure sensor using a diaphragm and piezo-resistance elements will be briefly explained.

Figure 1A:
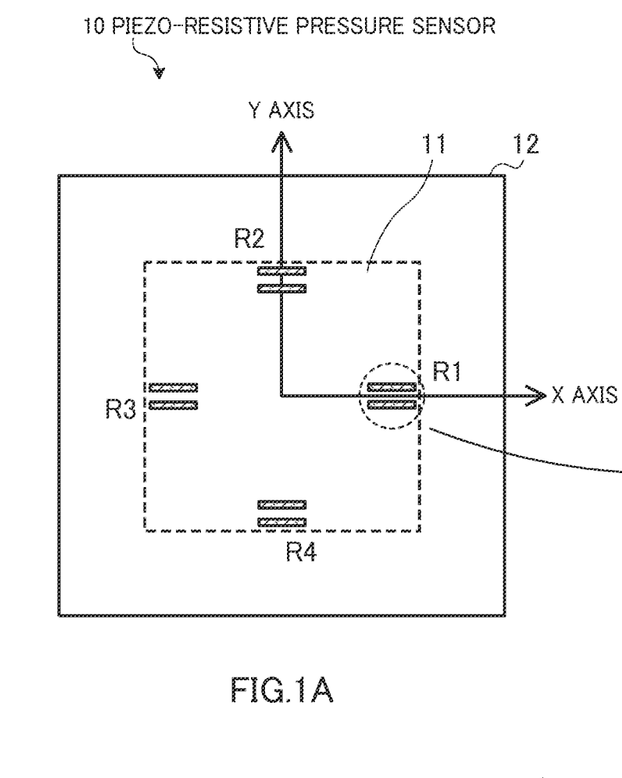
FIG. 1A is a plan view showing an overall configuration and FIG. 1B is a plan view showing how piezo-resistance elements are arranged in a piezo-resistance section.

FIG. 1 shows a structure of a conventional piezo-resistive pressure sensor. As shown in FIG. 1A, piezo-resistive pressure sensor 10 has diaphragm 11 and support section 12. Diaphragm 11 is supported, from its surrounding, by means of support section 12. By this means, diaphragm 11, in this state of being fixed from its surrounding by means of support section 12, bends according to the pressure applied to it.

Figure 1B:
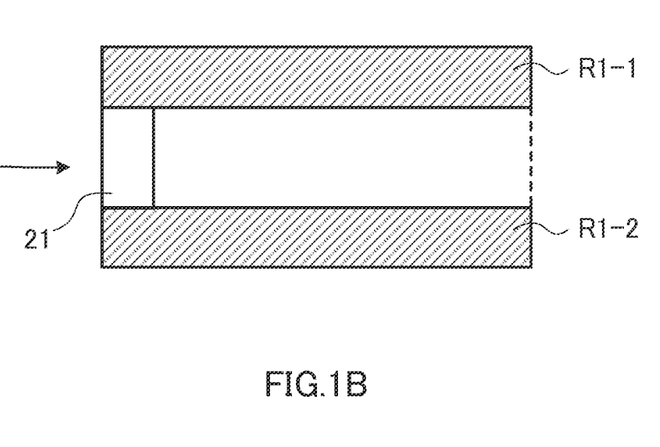

Piezo-resistance sections R1, R2, R3 and R4 are arranged in edge parts of diaphragm 11. Piezo-resistance sections R1, R2, R3 and R4 each have a plurality of piezo-resistance elements. FIG. 1B shows an example of arrangement of piezo-resistance elements in piezo-resistance section R1. In this example, piezo-resistance section R1 has two piezo-resistance elements R1-1 and R1-2 that are parallel to the X axis, and the ends of these piezo-resistance elements R1-1 and R1-2 on one side are connected by means of conductive wire 21 (for example, a diffusion wire), so that piezo-resistance elements R1-1 and R1-2 are connected serially. The other ends of piezo-resistance elements R1-1 and R1-2 are connected to the terminals of a bridge circuit (for example, aluminum wires). The arrangement of piezo-resistance elements in piezo-resistance sections R2, R3 and R4 is the same as in FIG. 1B.

Figure 2:
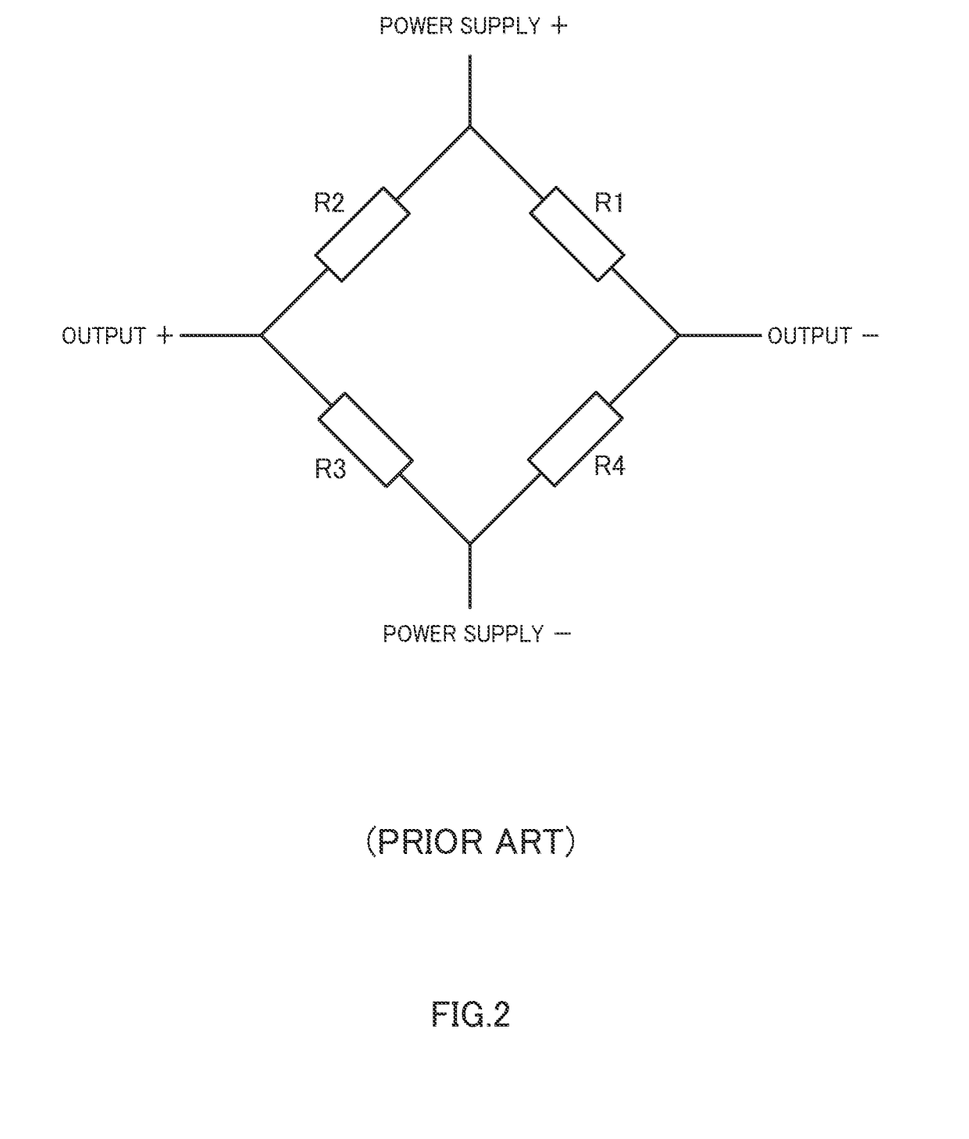
FIG. 2 is a connection diagram showing a bridge circuit formed with piezo-resistance sections.

FIG. 2 shows how piezo-resistance sections R1, R2, R3 and R4 constitute a bridge circuit. Note that the piezo-resistance elements are arranged so that the variation of resistance is reversed between adjoining piezo-resistance sections in the bridge circuit. That is to say, piezo-resistance sections R1 and R3 have or show the same variation of resistance, and piezo-resistance sections R2 and R4 have or show reverse variation of resistance from piezo-resistance sections R1 and R3).

Citation List

Patent Literature

PTL 1: Japanese Patent Application Laid-Open No. 2002-286567
PTL 2: Japanese Patent Application Laid-Open No. 2000-162056
PTL 3: Japanese Patent Application Laid-Open No. 2002-39888

SUMMARY OF INVENTION

Technical Problem

Now, there is a threat with a piezo-resistive pressure sensor that the accuracy of measurement might decrease due to heat emitted from the piezo-resistance elements.

The first possible factor of decrease of accuracy of measurement is the fluctuation of offset voltage when the power is turned on, due to the fact that the temperature distribution of piezo-resistance elements becomes non-uniform between piezo-resistance sections and the variation of piezo resistance values caused by increase of temperature also becomes non-uniform.

Also, a second possible factor of decrease of accuracy of measurement is the fluctuation of offset voltage when the power is turned on, due to the fact that the temperature distribution of piezo-resistance elements becomes non-uniform between piezo-resistance sections and the variation of stress caused by increase of temperature also becomes non-uniform because silicon, silicon oxide film, silicon oxynitride film and so on constituting the diaphragm all have different thermal expansion coefficients.

Thus, if the temperature distribution becomes non-uniform between piezo-resistance sections in a piezo-resistive pressure sensor, the piezo resistance value varies non-uniformly between piezo resistance sections and the stress of the diaphragm also varies non-uniformly between piezo resistance sections. As a result of this, there is a problem that the offset voltage fluctuates in a non-uniform fashion and the detection voltage varies when the power is turned on, damaging the accuracy of measurement by a sensor.

Patent literature 1 discloses a technique of reducing measurement error by arranging piezo-resistance elements in locations where the variation of stress due to the thermal stress variation of the diaphragm is less prone. Still, although with the technique of patent literature 1 it may be possible to reduce the decrease of accuracy of measurement to be caused by the above second factor. However, this technique of patent literature 1 is not enough to reduce the decrease of accuracy of measurement to be caused by the first factor described above.

So, taking into account the sensitivity of measurement, it is preferable to arrange piezo-resistance elements on a diaphragm, near the border between the diaphragm and the support section, where the diaphragm varies the most due to change of pressure. However, given that the thickness of the diaphragm and the thickness of the support section are not the same, the position where the temperature distribution is the steepest (that is, the position where the variation of temperature is the greatest) comes near the support section on the diaphragm. To place piezo-resistance elements in such locations means that the accuracy of measurement is more prone to decrease due to above the first and second factors.

It is therefore an object of the present invention to provide a piezo-resistive pressure sensor that realizes sensitive and accurate measurement of pressure, by reducing the variation of electrical conduction due to thermal variation in piezo resistance elements, without lowering the sensitivity of measurement.

Solution to Problem

The piezo-resistive pressure sensor of the present invention has: a diaphragm which has a square shaped plane; a support section which supports the diaphragm from surrounding; and a plurality of detection sections which are formed on the diaphragm near four sides of the diaphragm and near the support section, and, in this piezo-resistive pressure sensor, a plurality of piezo-resistance elements are arranged in parallel in each of the plurality of detection sections, and an area of a part where a group of piezo-resistance elements comprised of the plurality of piezo-resistance elements are arranged, and an outer shape of the part, are the same in each detection section.

Advantageous Effects of Invention

The present invention makes possible sensitive and accurate measurement of pressure, by reducing the variation of electrical conduction due to thermal variation in piezo resistance elements, without lowering the sensitivity of measurement.

BRIEF DESCRIPTION OF DRAWINGS

FIG. 1 show a structure of a conventional piezo-resistive pressure sensor, where

FIG. 3 show a structure of a piezo-resistive pressure sensor according to an embodiment, where

FIG. 6 show temperature distribution simulation results, where

FIG. 7 show offset voltage fluctuation measurement results, where

FIG. 8 show a structure of a piezo-resistive pressure sensor according to another embodiment, where FIG. 9 show a structure of a piezo-resistive pressure sensor according to another embodiment, where

DESCRIPTION OF EMBODIMENTS

Now, embodiments of the present invention will be described in detail with reference to the accompanying drawings.

Figure 3A:
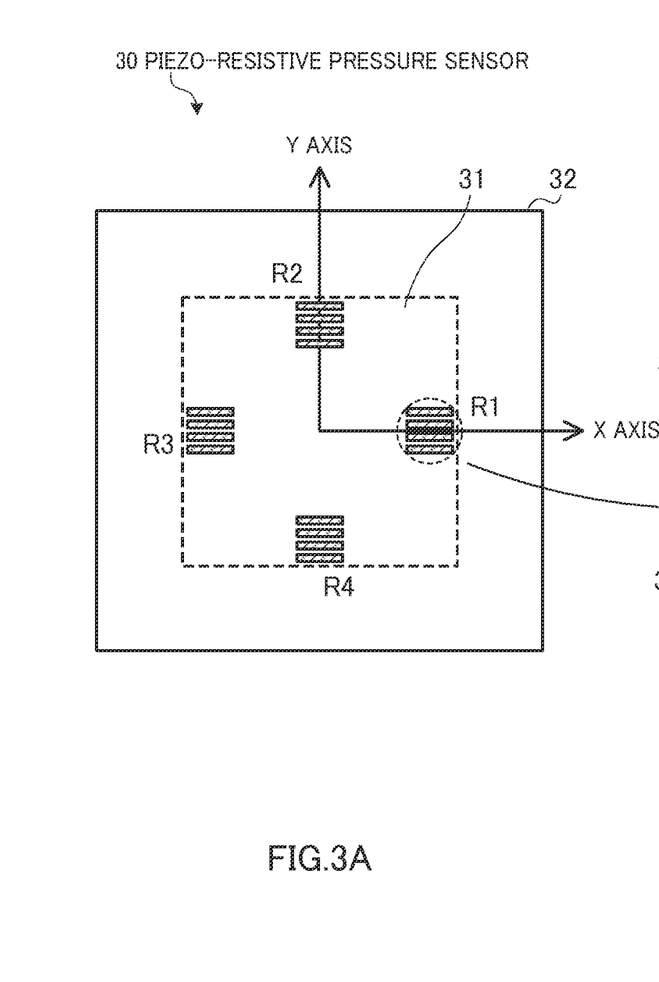
FIG. 3A is a plan view showing an overall configuration and FIG. 3B is a plan view showing how piezo-resistance elements are arranged in a piezo-resistance section.

FIG. 3 shows a structure of a piezo-resistive pressure sensor according en embodiment of the present invention. As shown in FIG. 3A, piezo-resistive pressure sensor 30 has diaphragm 31 and support section 32. Diaphragm 31 is supported, from its surrounding, by means of support section 32. By this means, diaphragm 11, in this state of being fixed from its surrounding by means of support section 12, is deformed according to the pressure applied to it.

Piezo-resistance sections R1, R2, R3 and R4 are arranged in edge parts of diaphragm 31 (that is, on diaphragm 31, near the four sides of diaphragm 31, or, in other words, on diaphragm 31, near the border between diaphragm 31 and support section 32). Piezo-resistance sections R1, R2, R3 and R4 each have a plurality of piezo-resistance elements.

Figure 3B:
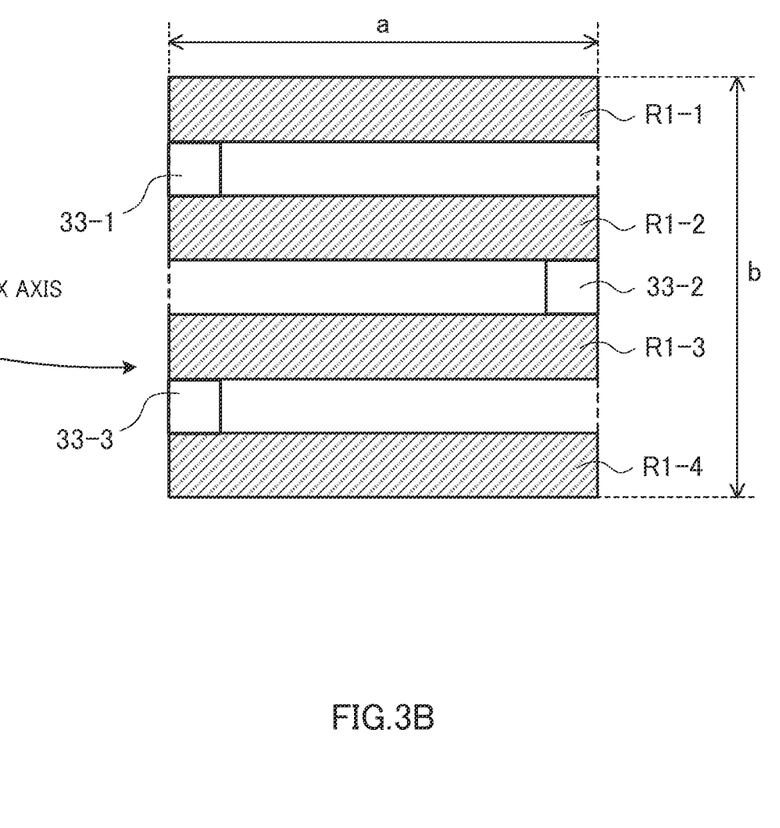

FIG. 3B shows how piezo-resistance elements are arranged in piezo-resistance section R1. In this example, piezo-resistance section R1 has four piezo-resistance elements R1-1, R1-2, R1-3 and R1-4 that are parallel to the X axis.

These multiple piezo-resistance elements R1-1, R1-2, R1-3 and R1-4 are arranged parallel to each other, at predetermined intervals. In addition, the outer shape of the part where a group of piezo-resistance elements, comprised of piezo-resistance elements R1-1, R1-2, R1-3 and R1-4, is virtually a square. That is to say, in FIG. 3B, a=b. In other words, piezo-resistance elements R1-1, R1-2, R1-3 and R1-4 are arranged such that the part formed with piezo-resistance elements R1-1, R1-2, R1-3 and R1-4 and portions where piezo-resistance elements are not present is virtually a square.

Piezo-resistance elements R1-1, R1-2, R1-3 and R1-4 are serially connected by conductive wires 33-1, 33-2 and 33-3 (for example, diffusion wires). For example, the right edge part of piezo-resistance element R1-1 and the right edge part of piezo-resistance element R1-4 are connected to terminals of a bridge circuit (for example, aluminum wires). The arrangement of piezo-resistance elements in piezo-resistance sections R2, R3 and R4 is the same as shown in FIG. 3B, and also the area of the part formed with piezo-resistance elements R1-1, R1-2, R1-3 and R1-4 and portions where piezo-resistance elements are not present, is all the same.

Also, piezo-resistance sections R1, R2, R3 and R4 arranged to have the same distance to the border between diaphragm 31 and support section 32. In other words, piezo-resistance sections R1, R2, R3 and R4 are arranged such that all have the same distance between a side of diaphragm 31 and the part where a group of piezo-resistance elements are arranged.

Piezo-resistance sections R1, R2, R3 and R4 form a bridge circuit, as shown in FIG. 2.

Figure 4:
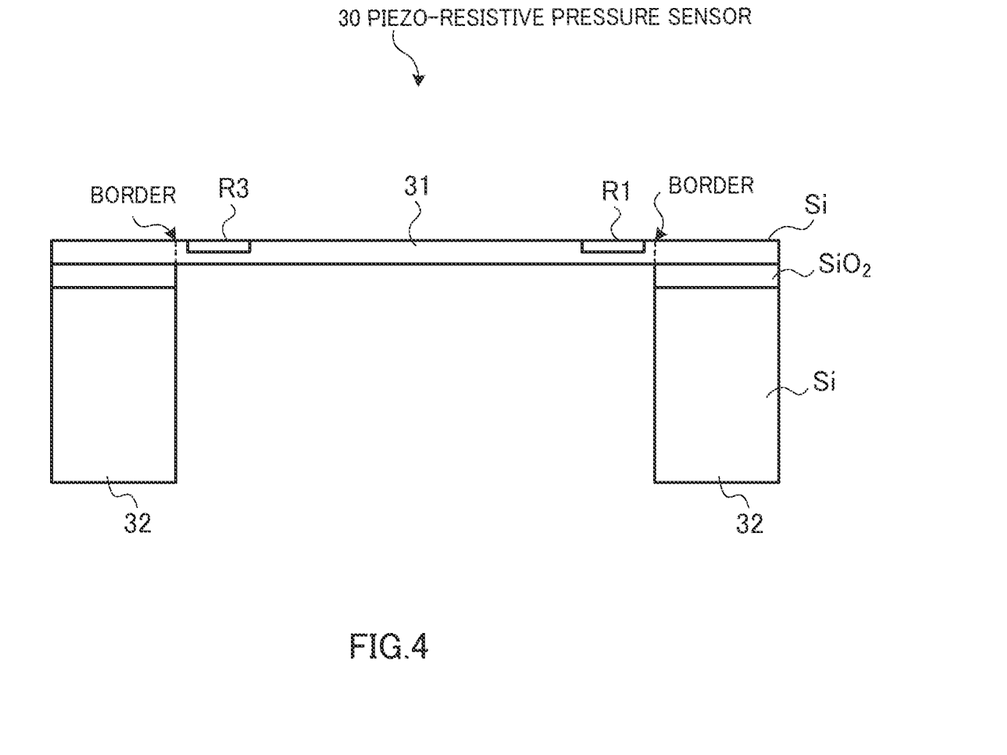
FIG. 4 is a cross sectional view of a piezo-resistive pressure sensor according to an embodiment, formed by anisotropic dry etching.

FIG. 4 shows a cross section of piezo-resistive pressure sensor 30. FIG. 4 is a schematic cross sectional view cutting a plane passing piezo-resistance sections R1 and R3.

As shown in FIG. 4, in piezo-resistive pressure sensor 30, diaphragm 31 and support section 32 are formed by providing a substrate on which Si, $SiO_2$, and Si are laminated in order from above, removing Si by applying anisotropic dry etching from below the substrate using $SiO_2$ as a etch stopper, and then removing $SiO_2$. Also, on diaphragm 31 near the border between diaphragm 31 and support section 32, piezo-resistance sections R1 and R3, made of P-type dopant such as boron, is formed by semiconductor processing such as diffusion and ion injection.

As shown in FIG. 4, piezo-resistive pressure sensor 30 of the present embodiment adopts anisotropic dry etching, so that support section 32 can be placed nearly at right angles with the plane of diaphragm 31. By this means, it is possible to increase the area of diaphragm 31.

Figure 5:
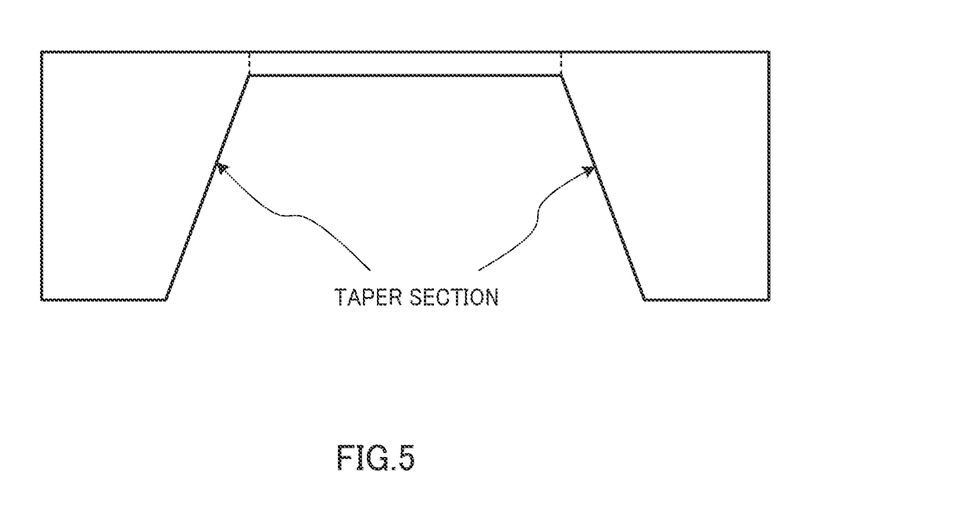
FIG. 5 is a cross sectional view of a piezo-resistive pressure sensor according to an embodiment, formed by anisotropic wet etching.

By contrast with this, in the event anisotropic wet etching is adopted, a taper section is formed in the support section, so that, compared to FIG. 4, the area of diaphragm 31 becomes small, and, as a result of this, the sensitivity of measurement decreases. Also, if the area of the diaphragm is increased in order to improve the accuracy of measurement, this in turn results in increasing the overall size of the apparatus.

That is to say, the present embodiment is designed to achieve small and sensitive piezo-resistive pressure sensor 30 by forming diaphragm 31 and support section 32 by means of anisotropic dry etching. However, the present invention is not limited to this and might as well adopt anisotropic wet etching.

Next, the operations of piezo-resistive pressure sensor 30 will be described.

When piezo-resistance sections R1, R2, R3 and R4 are powered on, the piezo-resistance elements of piezo-resistance sections R1, R2, R3 and R4 produce heat, and accordingly piezo-resistance sections R1, R2, R3 and R4 all produce heat.

Heat from piezo-resistance sections R1, R2, R3 and R4 is dissipated to support section 32, which is thicker than diaphragm 31. In this case, with piezo-resistive pressure sensor 30 of the present embodiment, the outer shape of the group of piezo-resistance elements of piezo-resistance sections R1, R2, R3 and R4 is virtually a square, so that the dissipation of heat in the X axis direction and the dissipation of heat in the Y axis direction become uniform. As a result of this, four piezo-resistance sections R1, R2, R3 and R4 have uniform temperature distribution.

The dissipation of heat in the X axis direction and the dissipation of heat in the Y axis direction become uniform, because the size of the part to face support section 32 is the same between all of piezo-resistance sections R1, R2, R3 and R4. Note that, however, with piezo-resistive pressure sensor 10 shown in FIG. 1, the outer shape of piezo-resistance sections R1, R2, R3 and R4 is long in the X axis direction and short in the Y axis direction, so that more heat is dissipated in the Y axis direction than in the X axis direction. As a result of this, with piezo-resistive pressure sensor 10 shown in FIG. 1, the temperature distribution in piezo-resistance sections R1 and R3 and the temperature distribution in piezo-resistance sections R2 and R4 become different.

Piezo-resistive pressure sensor 30 of the present embodiment allows uniform temperature distribution in four piezo-resistance sections R1, R2, R3 and R4, so that the variation of the piezo resistance value due to increase of temperature becomes uniform. As a result of this, the variation of offset voltage due to the variation of resistance value when the power is turned on, is reduced. Also, the variation of stress on diaphragm 31 due to increase of temperature becomes uniform. As a result of this, the variation of offset voltage due to variation of stress when the power is turned on, is reduced.

As described above, with piezo-resistive pressure sensor 30, offset voltage varies less as described above, so that it is possible to make the fluctuation of output voltage upon measurement of pressure and achieve accurate measurement results.

Figure 6A:
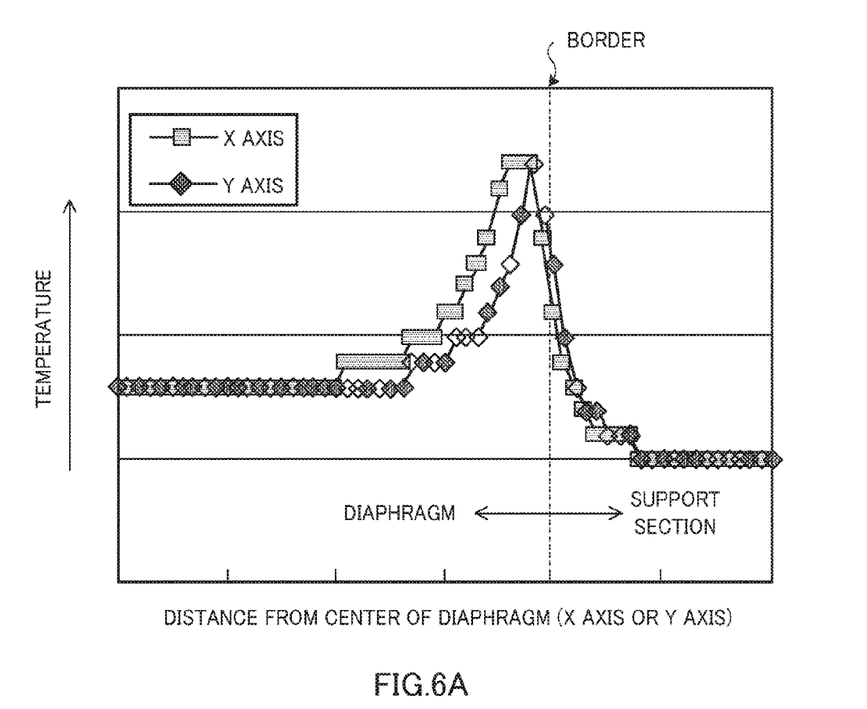
FIG. 6A shows a temperature distribution of conventional piezo-resistive pressure sensor 10 and FIG. 6B shows a temperature distribution of a piezo-resistive pressure sensor according to an embodiment.
Figure 6B:
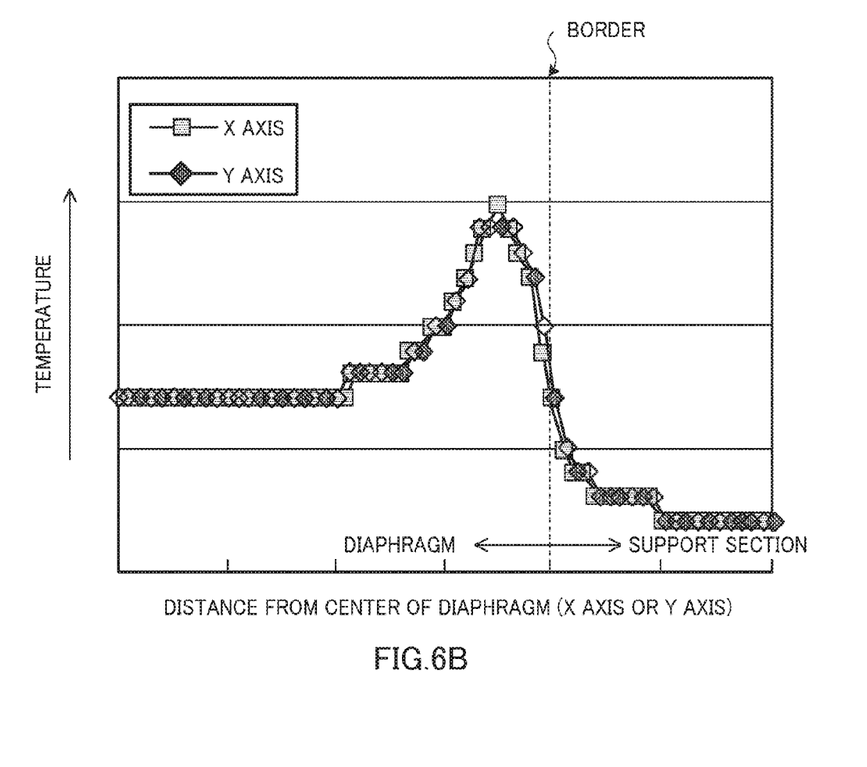

FIG. 6 shows a simulation result of temperature distribution on an X axis and Y axis from the center of a diaphragm to a support section. FIG. 6A shows the temperature distribution of conventional piezo-resistive pressure sensor 10 shown in FIG. 1. FIG. 6B shows the temperature distribution of piezo-resistive pressure sensor 30 of the present embodiment shown in FIG. 3. The temperature distribution of conventional piezo-resistive pressure sensor 10 does not match between the X axis and the Y axis (FIG. 6A), and the temperature of distribution piezo-resistive pressure sensor 30 of the present embodiment matches between the X axis and the Y axis (FIG. 6B).

Figure 7A:
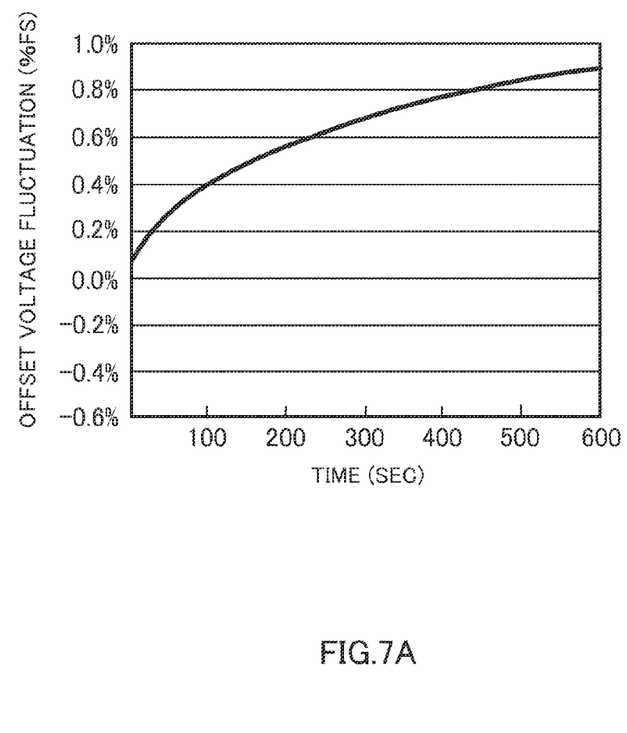
FIG. 7A shows offset voltage fluctuation of a conventional piezo-resistive pressure sensor and FIG. 7B shows offset voltage fluctuation of a piezo-resistive pressure sensor according to an embodiment.
Figure 7B:
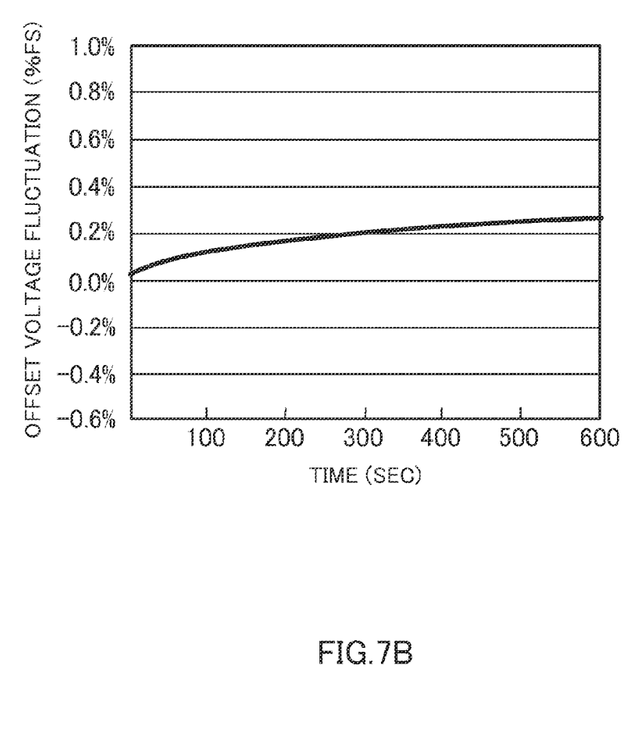

FIG. 7 show offset voltage variation measurement results from the time a bridge circuit is powered on. FIG. 7A shows offset voltage fluctuation in conventional piezo-resistive pressure sensor 10 shown in FIG. 1. FIG. 7B shows offset voltage fluctuation in piezo-resistive pressure sensor 30 according to the present embodiment shown in FIG. 3. In comparison with conventional piezo-resistive pressure sensor 10, piezo-resistive pressure sensor 30 of the present embodiment shows small offset voltage variation. Incidentally, generally speaking, the tolerable value of offset voltage fluctuation is 0.3% FS.

As described above, with the present embodiment, piezo-resistance sections R1, R2, R3 and R4 are arranged on diaphragm 31, near the border of diaphragm 31 and support section 32, and the outer shape of the group of piezo-resistance elements of piezo-resistance sections R1, R2, R3 and R4 is virtually a square, so that it is possible to reduce the variation of electrical conduction due to thermal variation in piezo resistance elements, without lowering the sensitivity of measurement.

That is to say, piezo-resistance sections R1, R2, R3 and R4 are arranged on diaphragm 31, near the border of diaphragm 31 and support section 32 where the variation of the diaphragm due to change of pressure is the greatest, so that the accuracy of measurement improves. However, the position where the temperature distribution is the steepest (that is, the position where the variation of temperature is the greatest on diaphragm 31) is also near the border between diaphragm 31 and support section 32, and so this is also a position where the non-uniformity of temperature is the most obvious. Taking the above into account, with the present embodiment, the outer shape of the part where a group of piezo-resistance elements of piezo-resistance sections R1, R2, R3 and R4 are placed is made virtually a square, and the distance to support section 32 is made the same for all of piezo-resistance sections R1, R2, R3 and R4, so that, even when piezo-resistance sections R1, R2, R3 and R4 are arranged near the border between diaphragm 31 and support section 32 where the temperature distribution is the steepest, it is still possible to make the temperature uniform and reduce the variation of electrical conduction due to thermal variation in piezo resistance elements, without lowering the sensitivity of measurement.

Figure 8A:
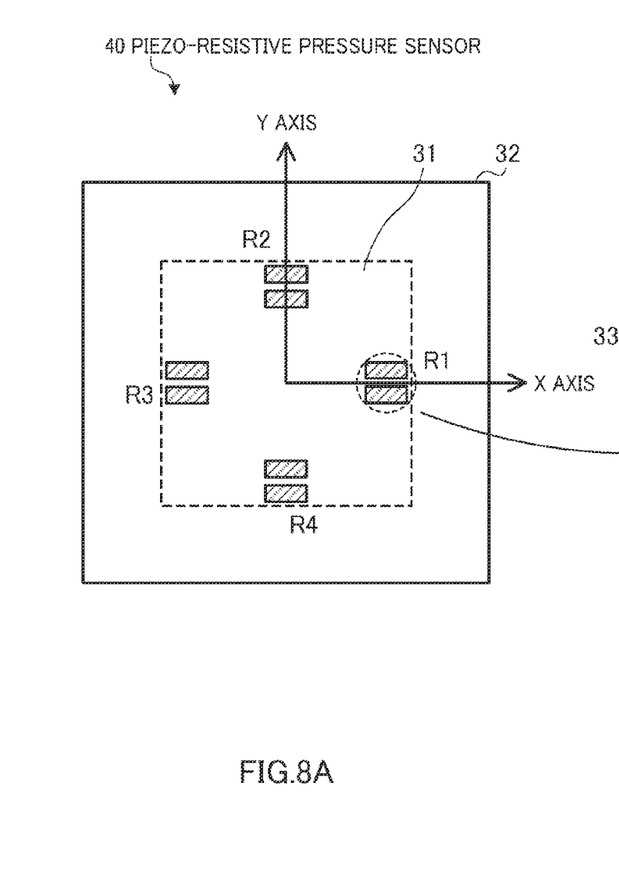
FIG. 8A is a plan view showing an overall configuration and FIG. 8B is a plan view showing how piezo-resistance elements are arranged in a piezo-resistance section.
Figure 8B:
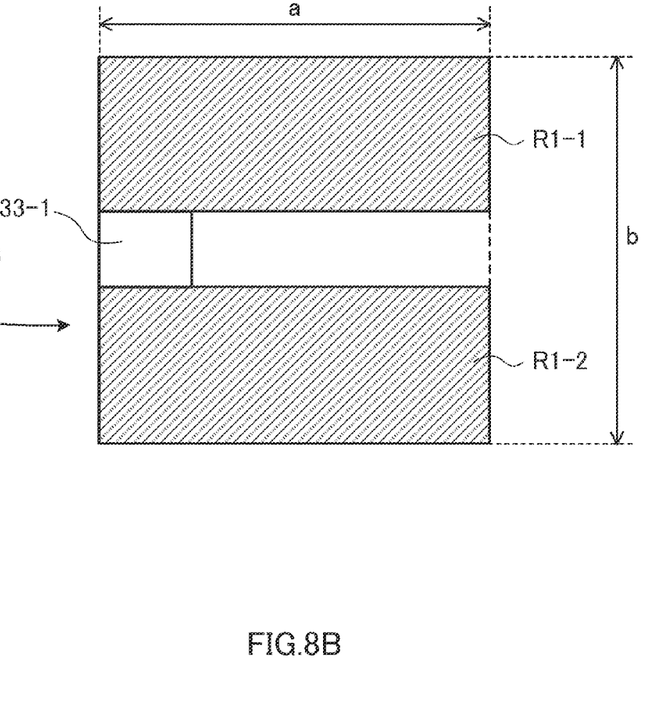
Figure 9A:
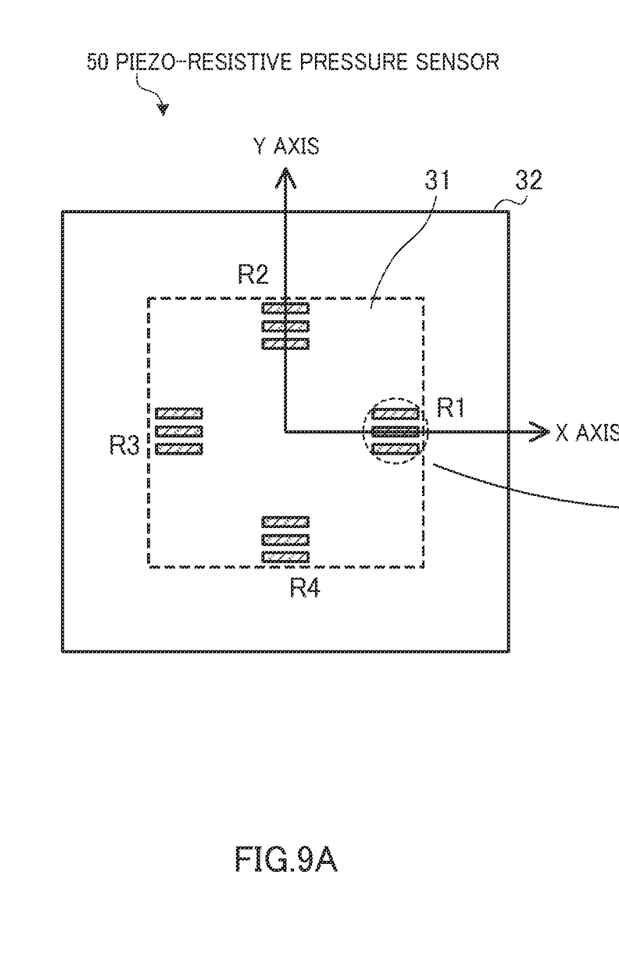
FIG. 9A is a plan view showing an overall configuration and FIG. 9B is a plan view showing how piezo-resistance elements are arranged in a piezo-resistance section.
Figure 9B:
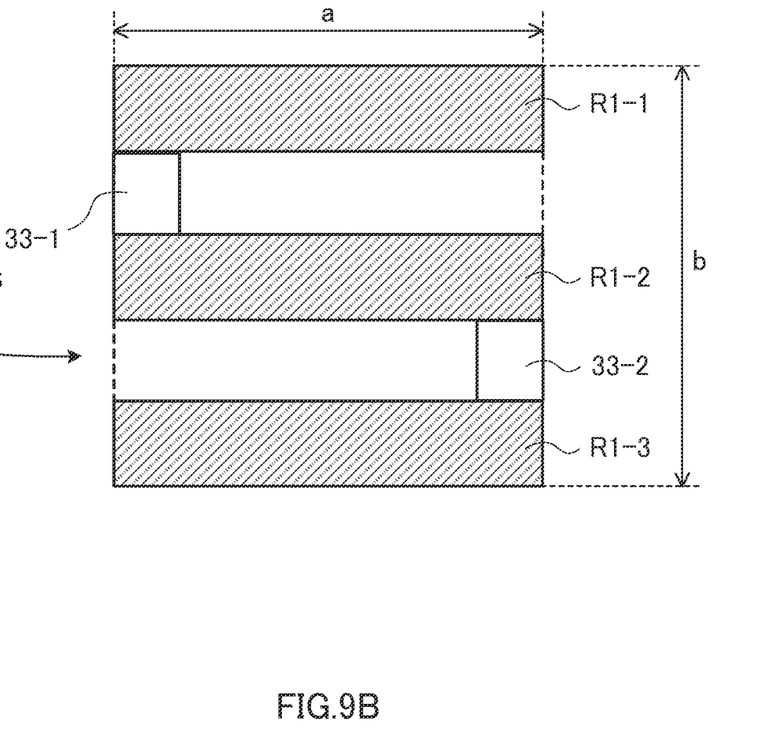

Although a case has been described above with the present embodiment where piezo-resistance sections R1, R2, R3 and R4 each have four piezo-resistance elements, the number of piezo-resistance elements is not limited to this. For example, like piezo-resistive pressure sensor 40 shown in FIG. 8, piezo-resistance sections R1, R2, R3 and R4 may all have two piezo-resistance elements each, or, like piezo-resistive pressure sensor 50 shown in FIG. 9, piezo-resistance section R1, R2 and R3 and R4 may all have three piezo-resistance elements each. Also, although a case has been described above where the outer shape of the part where a group of piezo-resistance elements constituting piezo-resistance sections R1, R2, R3 and R4 are arranged is virtually a square (that is, a=b), as long as the area and outer shape of the part where a group of piezo-resistance elements are arranged are the same, it is possible to achieve the same effect as the above-described embodiment.

Industrial Applicability

The piezo-resistive pressure sensor according to the present invention is applicable to a wide range of cases of detecting the pressure of gas and liquid, as well as the pressure of press operations by humans.

Reference Signs List

10, 30, 40, 50 Piezo-resistive pressure sensor
11, 31 Diaphragm
12, 32 Support section
21, 33-1, 33-2, 33-3 Conductive wire
R1, R2, R3, R4 Piezo-resistance section
R1-1, R1-2, R1-3, R1-4 Piezo-resistance element

The invention claimed is:

1. A piezo-resistive pressure sensor comprising:
a planar diaphragm which has a peripheral edge;
a support section which supports the diaphragm from surrounding; and
first, second, third and fourth piezo-resistance sections which each comprise a plurality of piezo-resistance elements arranged in parallel and which are formed on the diaphragm near the peripheral edge of the diaphragm and near the support section, the first and second piezo-resistance sections being arranged opposite to each other in a first direction on a plane of the diaphragm, the third and fourth piezo-resistance sections being arranged opposite to each other in a second direction on the plane of the diaphragm, the second direction being perpendicular to the first direction,
wherein the first, second, third and fourth piezo-resistance sections are the same as each other in area and in outer shape,
wherein the first, second, third and fourth piezo-resistance sections comprise respective facing portions which face the support section, and the facing portions of the first, second, third and fourth piezo-resistance sections are the same as each other in size.

2. The piezo-resistive pressure sensor according to claim 1, wherein:
the first, second, third and fourth piezo-resistance sections are each formed with the plurality of piezo-resistance elements and portions where the plurality of piezo-resistance elements are not present; and
the outer shape is substantially a regular square.

3. The piezo-resistive pressure sensor according to claim 1, wherein the distances between the peripheral edge of the diaphragm and the first, second, third and fourth piezo-resistance sections are the same.

4. The piezo-resistive pressure sensor according to claim 2, wherein the distances between the peripheral edge of the diaphragm and the first, second, third and fourth piezo-resistance sections are the same.

* * * * *